(12) United States Patent
Bollinger

(10) Patent No.: US 8,482,530 B2
(45) Date of Patent: Jul. 9, 2013

(54) METHOD OF CAPACITIVELY SENSING FINGER POSITION

(75) Inventor: Steven Bollinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1150 days.

(21) Appl. No.: 11/842,724

(22) Filed: Aug. 21, 2007

(65) Prior Publication Data

US 2008/0111795 A1 May 15, 2008

Related U.S. Application Data

(60) Provisional application No. 60/858,404, filed on Nov. 13, 2006.

(51) Int. Cl.
| | |
|---|---|
| *G06F 3/041* | (2006.01) |
| *G06F 3/043* | (2006.01) |
| *G01R 27/26* | (2006.01) |
| *H03K 17/94* | (2006.01) |
| *H03M 11/00* | (2006.01) |

(52) U.S. Cl.
USPC .............. 345/173; 345/177; 324/686; 341/20

(58) Field of Classification Search
USPC ........................................................ 345/173
See application file for complete search history.

(56) References Cited

U.S. PATENT DOCUMENTS

| | | | |
|---|---|---|---|
| 1,061,578 A | 5/1913 | Wischhusen et al. | |
| 2,063,276 A | 12/1936 | Thomas | |
| 2,798,907 A | 7/1957 | Schneider | |
| 2,903,229 A | 9/1959 | Landge | |
| 2,945,111 A | 7/1960 | McCormick | |
| 3,005,055 A | 10/1961 | Mattke | |
| 3,965,399 A | 6/1976 | Walker et al. | |
| 3,996,441 A | 12/1976 | Ohashi | |
| 4,029,915 A | 6/1977 | Ojima | |
| 4,103,252 A | 7/1978 | Bobick | |
| 4,110,749 A | 8/1978 | Janko et al. | |
| 4,115,670 A | 9/1978 | Chandler | |
| 4,121,204 A | 10/1978 | Welch et al. | |
| 4,129,747 A | 12/1978 | Pepper | |
| 4,158,216 A | 6/1979 | Bigelow | |
| 4,233,522 A | 11/1980 | Grummer et al. | |
| 4,242,676 A | 12/1980 | Piguet et al. | |
| 4,246,452 A | 1/1981 | Chandler | |

(Continued)

FOREIGN PATENT DOCUMENTS

| | | |
|---|---|---|
| CN | 1139235 | 1/1997 |
| CN | 1455615 | 11/2003 |

(Continued)

OTHER PUBLICATIONS

Robbin, U.S. Appl. No. 60/346,237 entitled, "Method and System for List Scrolling," filed Oct. 22, 2001; 12 pages.

(Continued)

*Primary Examiner* — Charles V Hicks
(74) *Attorney, Agent, or Firm* — Morrison & Foerster LLP

(57) ABSTRACT

Sensor array configurations that allow for the accurate determination of an object's position are disclosed. The sensor configurations utilize a plurality of varying length sensors that have staggered beginning and ending positions. By staggering the beginning and ending positions of the varying length sensors, fewer sensors need to be utilized in a given area to provide accurate positional information.

37 Claims, 8 Drawing Sheets

U.S. PATENT DOCUMENTS

| | | | |
|---|---|---|---|
| 4,264,903 A | 4/1981 | Bigelow | |
| 4,266,144 A | 5/1981 | Bristol | |
| 4,293,734 A | 10/1981 | Pepper, Jr. | |
| D264,969 S | 6/1982 | McGoutry | |
| 4,338,502 A | 7/1982 | Hashimoto et al. | |
| 4,380,007 A | 4/1983 | Steinegger | |
| 4,380,040 A | 4/1983 | Posset | |
| 4,394,649 A | 7/1983 | Suchoff et al. | |
| 4,475,008 A | 10/1984 | Doi et al. | |
| 4,570,149 A | 2/1986 | Thornburg et al. | |
| 4,583,161 A | 4/1986 | Gunderson et al. | |
| 4,587,378 A | 5/1986 | Moore | |
| 4,604,786 A | 8/1986 | Howie, Jr. | |
| 4,613,736 A | 9/1986 | Shichijo et al. | |
| 4,644,100 A | 2/1987 | Brenner et al. | |
| 4,719,524 A | 1/1988 | Morishima et al. | |
| 4,734,034 A | 3/1988 | Maness et al. | |
| 4,736,191 A * | 4/1988 | Matzke et al. | 341/20 |
| 4,739,191 A | 4/1988 | Puar | |
| 4,739,299 A | 4/1988 | Eventoff et al. | |
| 4,752,655 A | 6/1988 | Tajiri et al. | |
| 4,755,765 A | 7/1988 | Ferland | |
| 4,764,717 A | 8/1988 | Tucker et al. | |
| 4,771,139 A | 9/1988 | DeSmet | |
| 4,798,919 A | 1/1989 | Miessler et al. | |
| 4,810,992 A | 3/1989 | Eventoff | |
| 4,822,957 A | 4/1989 | Talmage, Jr. et al. | |
| 4,831,359 A | 5/1989 | Newell | |
| 4,849,852 A | 7/1989 | Mullins | |
| 4,856,993 A | 8/1989 | Maness et al. | |
| 4,860,768 A | 8/1989 | Hon et al. | |
| 4,866,602 A | 9/1989 | Hall | |
| 4,876,524 A | 10/1989 | Jenkins | |
| 4,897,511 A | 1/1990 | Itaya et al. | |
| 4,914,624 A | 4/1990 | Dunthorn | |
| 4,917,516 A | 4/1990 | Retter | |
| 4,943,889 A | 7/1990 | Ohmatoi | |
| 4,951,036 A | 8/1990 | Grueter et al. | |
| 4,954,823 A | 9/1990 | Binstead | |
| 4,976,435 A | 12/1990 | Shatford et al. | |
| 4,990,900 A | 2/1991 | Kikuchi | |
| 5,008,497 A | 4/1991 | Asher | |
| 5,036,321 A | 7/1991 | Leach et al. | |
| 5,053,757 A | 10/1991 | Meadows | |
| 5,086,870 A | 2/1992 | Bolduc | |
| 5,125,077 A | 6/1992 | Hall | |
| 5,159,159 A | 10/1992 | Asher | |
| 5,179,648 A | 1/1993 | Hauck | |
| 5,186,646 A | 2/1993 | Pederson | |
| 5,192,082 A | 3/1993 | Inoue et al. | |
| 5,193,669 A | 3/1993 | Demeo et al. | |
| 5,231,326 A | 7/1993 | Echols | |
| 5,237,311 A | 8/1993 | Mailey et al. | |
| 5,278,362 A | 1/1994 | Ohashi | |
| 5,305,017 A | 4/1994 | Gerpheide | |
| 5,313,027 A | 5/1994 | Inoue et al. | |
| D349,280 S | 8/1994 | Kaneko | |
| 5,339,213 A | 8/1994 | O'Callaghan | |
| 5,367,199 A | 11/1994 | Lefkowitz et al. | |
| 5,374,787 A | 12/1994 | Miller et al. | |
| 5,379,057 A | 1/1995 | Clough et al. | |
| 5,404,152 A | 4/1995 | Nagai | |
| 5,408,621 A | 4/1995 | Ben-Arie | |
| 5,414,445 A | 5/1995 | Kaneko et al. | |
| 5,416,498 A | 5/1995 | Grant | |
| 5,424,756 A | 6/1995 | Ho et al. | |
| 5,432,531 A | 7/1995 | Calder et al. | |
| 5,438,331 A | 8/1995 | Gilligan et al. | |
| D362,431 S | 9/1995 | Kaneko et al. | |
| 5,450,075 A | 9/1995 | Waddington | |
| 5,453,761 A | 9/1995 | Tanaka | |
| 5,473,343 A | 12/1995 | Kimmich et al. | |
| 5,473,344 A | 12/1995 | Bacon et al. | |
| 5,479,192 A | 12/1995 | Carroll, Jr. et al. | |
| 5,494,157 A | 2/1996 | Golenz et al. | |
| 5,495,566 A | 2/1996 | Kwatinetz | |
| 5,508,703 A | 4/1996 | Okamura et al. | |
| 5,508,717 A | 4/1996 | Miller | |
| 5,543,588 A | 8/1996 | Bisset et al. | |
| 5,543,591 A | 8/1996 | Gillespie et al. | |
| 5,555,004 A | 9/1996 | Ono et al. | |
| 5,559,301 A | 9/1996 | Bryan, Jr. et al. | |
| 5,559,943 A | 9/1996 | Cyr et al. | |
| 5,561,445 A | 10/1996 | Miwa et al. | |
| 5,564,112 A | 10/1996 | Hayes et al. | |
| 5,565,887 A | 10/1996 | McCambridge et al. | |
| 5,578,817 A | 11/1996 | Bidiville et al. | |
| 5,581,670 A | 12/1996 | Bier et al. | |
| 5,585,823 A | 12/1996 | Duchon et al. | |
| 5,589,856 A | 12/1996 | Stein et al. | |
| 5,589,893 A | 12/1996 | Gaughan et al. | |
| 5,596,347 A | 1/1997 | Robertson et al. | |
| 5,596,697 A | 1/1997 | Foster et al. | |
| 5,598,183 A | 1/1997 | Robertson et al. | |
| 5,611,040 A | 3/1997 | Brewer et al. | |
| 5,611,060 A | 3/1997 | Belfiore et al. | |
| 5,613,137 A | 3/1997 | Bertram et al. | |
| 5,617,114 A | 4/1997 | Bier et al. | |
| 5,627,531 A | 5/1997 | Posso et al. | |
| 5,632,679 A | 5/1997 | Tremmel | |
| 5,640,258 A | 6/1997 | Kurashima et al. | |
| 5,648,642 A | 7/1997 | Miller et al. | |
| D382,550 S | 8/1997 | Kaneko et al. | |
| 5,657,012 A | 8/1997 | Tait | |
| 5,661,632 A | 8/1997 | Register | |
| D385,542 S | 10/1997 | Kaneko et al. | |
| 5,675,362 A | 10/1997 | Clough et al. | |
| 5,689,285 A | 11/1997 | Asher | |
| 5,721,849 A | 2/1998 | Amro | |
| 5,726,687 A | 3/1998 | Belfiore et al. | |
| 5,729,219 A | 3/1998 | Armstrong et al. | |
| 5,730,165 A | 3/1998 | Philipp | |
| 5,748,185 A | 5/1998 | Stephan et al. | |
| 5,751,274 A | 5/1998 | Davis | |
| 5,754,890 A | 5/1998 | Holmdahl et al. | |
| 5,764,066 A | 6/1998 | Novak et al. | |
| 5,777,605 A | 7/1998 | Yoshinobu et al. | |
| 5,786,818 A | 7/1998 | Brewer et al. | |
| 5,790,769 A | 8/1998 | Buxton et al. | |
| 5,798,752 A | 8/1998 | Buxton et al. | |
| 5,805,144 A | 9/1998 | Scholder et al. | |
| 5,808,602 A | 9/1998 | Sellers | |
| 5,812,239 A | 9/1998 | Eger | |
| 5,812,498 A | 9/1998 | Terés | |
| 5,815,141 A | 9/1998 | Phares | |
| 5,825,351 A | 10/1998 | Tam | |
| 5,825,352 A | 10/1998 | Bisset et al. | |
| 5,825,353 A | 10/1998 | Will | |
| 5,828,364 A | 10/1998 | Siddiqui | |
| 5,838,304 A | 11/1998 | Hall | |
| 5,841,078 A | 11/1998 | Miller et al. | |
| 5,841,423 A | 11/1998 | Carroll, Jr. et al. | |
| D402,281 S | 12/1998 | Ledbetter et al. | |
| 5,850,213 A | 12/1998 | Imai et al. | |
| 5,856,645 A | 1/1999 | Norton | |
| 5,856,822 A | 1/1999 | Du et al. | |
| 5,859,629 A | 1/1999 | Tognazzini | |
| 5,861,875 A | 1/1999 | Gerpheide | |
| 5,869,791 A | 2/1999 | Young | |
| 5,875,311 A | 2/1999 | Bertram et al. | |
| 5,883,619 A | 3/1999 | Ho et al. | |
| 5,889,236 A | 3/1999 | Gillespie et al. | |
| 5,889,511 A | 3/1999 | Ong et al. | |
| 5,894,117 A | 4/1999 | Kamishima | |
| 5,903,229 A | 5/1999 | Kishi | |
| 5,907,152 A | 5/1999 | Dandiliker et al. | |
| 5,907,318 A | 5/1999 | Medina | |
| 5,909,211 A | 6/1999 | Combs et al. | |
| 5,910,802 A | 6/1999 | Shields et al. | |
| 5,914,706 A | 6/1999 | Kono | |
| 5,923,388 A | 7/1999 | Kurashima et al. | |
| D412,940 S | 8/1999 | Kato et al. | |
| 5,933,102 A | 8/1999 | Miller et al. | |
| 5,933,141 A | 8/1999 | Smith | |
| 5,936,619 A | 8/1999 | Nagasaki et al. | |
| 5,943,044 A | 8/1999 | Martinelli et al. | |
| 5,953,000 A | 9/1999 | Weirich | |

| | | |
|---|---|---|
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 * | 10/2001 | Kent et al. .................. 345/173 |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimäki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B2 | 10/2006 | Rosedale |
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |

| | | |
|---|---|---|
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,671,837 B2 | 3/2010 | Forsblad et al. |
| 7,692,431 B2 * | 4/2010 | Mackey .................. 324/660 |
| 7,708,051 B2 | 5/2010 | Katsumi et al. |
| 7,772,507 B2 | 8/2010 | Orr et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 * | 7/2003 | Iizuka et al. .................. 345/173 |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0162402 A1 | 7/2005 | Watanachote |
| 2005/0204309 A1 | 9/2005 | Szeto |
| 2005/0237308 A1 | 10/2005 | Autio et al. |
| 2006/0026521 A1 | 2/2006 | Hotelling et al. |
| 2006/0032680 A1 | 2/2006 | Elias et al. |
| 2006/0038791 A1 * | 2/2006 | Mackey .................. 345/173 |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriot et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |

| | | | | | | |
|---|---|---|---|---|---|---|
| 2008/0143681 A1 | 6/2008 | XiaoPing | | GB | 2333215 | 7/1999 |
| 2008/0165158 A1 | 7/2008 | Hotelling et al. | | GB | 2391060 | 1/2004 |
| 2008/0196945 A1 | 8/2008 | Konstas | | GB | 2 402 105 | 12/2004 |
| 2008/0202824 A1 | 8/2008 | Philipp et al. | | JP | 57-95722 | 6/1982 |
| 2008/0209442 A1 | 8/2008 | Setlur et al. | | JP | 57-97626 | 6/1982 |
| 2008/0264767 A1 | 10/2008 | Chen et al. | | JP | 61-117619 | 6/1986 |
| 2008/0280651 A1 | 11/2008 | Duarte | | JP | 61-124009 | 6/1986 |
| 2008/0284742 A1 | 11/2008 | Prest | | JP | 63-20411 | 1/1988 |
| 2008/0293274 A1 | 11/2008 | Milan | | JP | 63-106826 | 5/1988 |
| 2009/0021267 A1* | 1/2009 | Golovchenko et al. ....... 324/686 | | JP | 63-181022 | 7/1988 |
| 2009/0026558 A1 | 1/2009 | Bauer et al. | | JP | 63-298518 | 12/1988 |
| 2009/0033635 A1 | 2/2009 | Wai | | JP | 03-57617 | 6/1991 |
| 2009/0036176 A1 | 2/2009 | Ure | | JP | 3-192418 | 8/1991 |
| 2009/0058687 A1 | 3/2009 | Rothkopf et al. | | JP | 04-32920 | 2/1992 |
| 2009/0058801 A1 | 3/2009 | Bull | | JP | 4-205408 | 7/1992 |
| 2009/0058802 A1 | 3/2009 | Orsley et al. | | JP | 5-041135 | 2/1993 |
| 2009/0073130 A1 | 3/2009 | Weber et al. | | JP | 5-080938 | 4/1993 |
| 2009/0078551 A1 | 3/2009 | Kang | | JP | 5-101741 | 4/1993 |
| 2009/0109181 A1 | 4/2009 | Hui et al. | | JP | 5-36623 | 5/1993 |
| 2009/0141046 A1 | 6/2009 | Rathnam et al. | | JP | 5-189110 | 7/1993 |
| 2009/0160771 A1 | 6/2009 | Hinckley et al. | | JP | 5-205565 | 8/1993 |
| 2009/0179854 A1 | 7/2009 | Weber et al. | | JP | 5-211021 | 8/1993 |
| 2009/0197059 A1 | 8/2009 | Weber et al. | | JP | 5-217464 | 8/1993 |
| 2009/0229892 A1 | 9/2009 | Fisher et al. | | JP | 5-233141 | 9/1993 |
| 2009/0273573 A1 | 11/2009 | Hotelling | | JP | 5-262276 | 10/1993 |
| 2010/0058251 A1 | 3/2010 | Rottler et al. | | JP | 5-265656 | 10/1993 |
| 2010/0060568 A1 | 3/2010 | Fisher et al. | | JP | 5-274956 | 10/1993 |
| 2010/0073319 A1 | 3/2010 | Lyon et al. | | JP | 5-289811 | 11/1993 |
| 2010/0149127 A1 | 6/2010 | Fisher et al. | | JP | 5-298955 | 11/1993 |
| 2010/0289759 A1 | 11/2010 | Fisher et al. | | JP | 5-325723 | 12/1993 |
| 2010/0313409 A1 | 12/2010 | Weber et al. | | JP | 6-20570 | 1/1994 |
| 2011/0005845 A1 | 1/2011 | Hotelling et al. | | JP | 6-084428 | 3/1994 |
| | | | | JP | 6-089636 | 3/1994 |
| FOREIGN PATENT DOCUMENTS | | | | JP | 6-96639 | 4/1994 |
| | | | | JP | 6-111695 | 4/1994 |
| CN | 1499356 | 5/2004 | | JP | 6-139879 | 5/1994 |
| CN | 1637776 | 7/2005 | | JP | 6-187078 | 7/1994 |
| CN | 1659506 | 8/2005 | | JP | 6-208433 | 7/1994 |
| DE | 3615742 | 11/1987 | | JP | 6-267382 | 9/1994 |
| DE | 19722636 | 12/1998 | | JP | 6-283993 | 10/1994 |
| DE | 10022537 | 11/2000 | | JP | 6-333459 | 12/1994 |
| DE | 20019074 U1 | 2/2001 | | JP | 7-107574 | 4/1995 |
| DE | 10 2004 043 663 | 4/2006 | | JP | 7-41882 | 7/1995 |
| EP | 0178157 | 4/1986 | | JP | 7-201249 | 8/1995 |
| EP | 0419145 A1 | 3/1991 | | JP | 7-201256 | 8/1995 |
| EP | 0 498 540 | 8/1992 | | JP | 7-253838 | 10/1995 |
| EP | 0 521 683 | 1/1993 | | JP | 7-261899 | 10/1995 |
| EP | 0 674 288 | 9/1995 | | JP | 7-261922 | 10/1995 |
| EP | 0 731 407 | 9/1996 | | JP | 7-296670 | 11/1995 |
| EP | 0 551 778 B1 | 1/1997 | | JP | 7-319001 | 12/1995 |
| EP | 0 880 091 A2 | 11/1998 | | JP | 8-016292 | 1/1996 |
| EP | 1 026 713 | 8/2000 | | JP | 8-115158 | 5/1996 |
| EP | 1 081 922 A2 | 3/2001 | | JP | 8-203387 | 8/1996 |
| EP | 1 098 241 A2 | 5/2001 | | JP | 8-293226 | 11/1996 |
| EP | 1 133 057 | 9/2001 | | JP | 8-298045 | 11/1996 |
| EP | 1 162 826 A2 | 12/2001 | | JP | 8-299541 | 11/1996 |
| EP | 1 168 396 | 1/2002 | | JP | 8-316664 | 11/1996 |
| EP | 1 205 836 A2 | 5/2002 | | JP | 9-044289 | 2/1997 |
| EP | 1 244 053 | 9/2002 | | JP | 9-069023 | 3/1997 |
| EP | 1 251 455 A2 | 10/2002 | | JP | 9-128148 | 5/1997 |
| EP | 1263193 | 12/2002 | | JP | 9-134248 | 5/1997 |
| EP | 1347481 | 9/2003 | | JP | 9-218747 | 8/1997 |
| EP | 1376326 | 1/2004 | | JP | 9-230993 | 9/1997 |
| EP | 1 467 392 | 10/2004 | | JP | 9-231858 | 9/1997 |
| EP | 1 482 401 | 12/2004 | | JP | 9-233161 | 9/1997 |
| EP | 1 496 467 | 1/2005 | | JP | 9-251347 | 9/1997 |
| EP | 1 517 228 | 3/2005 | | JP | 9-258895 | 10/1997 |
| EP | 1 542 437 A2 | 6/2005 | | JP | 9-288926 | 11/1997 |
| EP | 1 589 407 | 10/2005 | | JP | 9-512979 | 12/1997 |
| EP | 1 784 058 A2 | 5/2007 | | JP | 10-63467 | 3/1998 |
| EP | 1 841 188 | 10/2007 | | JP | 10-74127 | 3/1998 |
| EP | 1850218 | 10/2007 | | JP | 10-074429 | 3/1998 |
| EP | 1 876 711 | 1/2008 | | JP | 10-198507 | 7/1998 |
| FR | 2 686 440 | 7/1993 | | JP | 10-227878 | 8/1998 |
| GB | 2015167 | 9/1979 | | JP | 10-240693 | 9/1998 |
| GB | 2072389 | 9/1981 | | JP | 10-320322 | 12/1998 |
| GB | 2 171 524 | 8/1986 | | JP | 10-326149 | 12/1998 |
| GB | 2315186 | 1/1998 | | JP | 11-24834 | 1/1999 |
| | | | | JP | 11-184607 | 7/1999 |

| | | |
|---|---|---|
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | 200404246 | 3/2004 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | WO 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 | 5/2003 |
| WO | WO 03/044956 | 5/2003 |
| WO | WO-03/025960 | 9/2003 |
| WO | WO 03/088176 | 10/2003 |
| WO | WO 03/090008 | 10/2003 |
| WO | WO-04/001573 | 12/2003 |
| WO | WO 2004/040606 | 5/2004 |
| WO | WO-2004/091956 | 10/2004 |
| WO | WO-2005/055620 | 6/2005 |
| WO | WO 2005/076117 | 8/2005 |
| WO | WO-2005/114369 | 12/2005 |
| WO | WO 2005/124526 | 12/2005 |
| WO | WO-2006/020305 | 2/2006 |
| WO | WO-2006/021211 A2 | 3/2006 |
| WO | WO 2006/037545 | 4/2006 |
| WO | WO 2006/104745 | 10/2006 |
| WO | WO-2006/135127 | 12/2006 |
| WO | WO 2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Zadesky et al., U.S. Appl. No. 60/359,551 entitled "Touchpad for Handheld Device," filed Feb. 25, 2002; 34 pages.

Grignon et al., U.S. Appl. No. 60/755,656, filed Dec. 30, 2005, entitled "Touch Pad with Feedback"; 109 pages.

Elias et al., U.S. Appl. No. 60/522,107, filed Aug. 16, 2004, entitled, "A Method for Increasing the Spatial Resolution of Touch Sensitive Devices"; 15 pages.

Hotelling, U.S. Appl. No. 60/658,777 titled "Multi-Functional Handheld Device," filed Mar. 4, 2005; 68 pages [.

Zadesky et al., U.S. Appl. No. 60/714,609 entitled "Scrolling Input Arrangements Using Capacitive Sensors on a Flexible Membrane," filed Sep. 6, 2005; 17 pages.

Lampell et al., U.S. Appl. No. 60/810,423, filed Jun. 2, 2006, entitled "Techniques for Interactive Input to Portable Electronic Devices"; 53 pages.

Prest et al., U.S. Appl. No. 60/850,662, filed Oct. 11, 2006, entitled, "Capacitive Scroll Wheel"; 21 pages.

Bollinger, U.S. Appl. No. 60/858,404, filed Nov. 13, 2006, entitled "Method of Capacitively Sensing Finger Position"; 13 pages.

Rothkopf, U.S. Appl. No. 60/935,854 titled "Compact Media Players," filed Sep. 4, 2007; 36 pages.

Rathnam et al., U.S. Appl. No. 60/992,056, filed Dec. 3, 2007, entitled, "Scroll Wheel Circuit Arrangements and Methods of Use Thereof"; 42 pages.

Rathnam et al., U.S. Appl. No. 61/017,436, filed Dec. 28, 2007, entitled, "Multi-Touch Scroll Wheel Circuit Arrangements and Processing Methods"; 58 pages.

Weber et al., U.S. Appl. No. 61/020,531, filed Jan. 11, 2008 entitled "Modifiable Clickwheel Text"; 11 pages.

Weber et al., U.S. Appl. No. 61/025,531, filed Feb. 1, 2008 entitled "Co-Extruded Materials and Methods"; 11 pages.

Fisher et al., U.S. Appl. No. 61/036,804, filed Mar. 14, 2008 entitled "Switchable Sensor Configurations"; 46 pages.

Interlink Electronics, VersaPad: Integration Guide, ©1998 (VersaPad), pp. 1-35.

Ng et al., U.S. Office Action mailed Jan. 14, 2010, directed to U.S. Appl. No. 11/394,493; 20 pages.

Ng et al., U.S. Office Action mailed Jan. 15, 2010, directed to U.S. Appl. No. 11/882,423; 22 pages.

Tsuk et al., U.S. Office Action mailed Dec. 31, 2009, directed to U.S. Appl. No. 11/610,190; 25 pages.

Zadesky et al., U.S. Office Action mailed Feb. 4, 2010, directed to U.S. Appl. No. 11/477,469; 14 pages.

Hotelling, U.S. Office Action mailed Jan. 25, 2010, directed to U.S. Appl. No. 11/482,286; 17 pages.

Lynch et al., U.S. Office Action mailed Oct. 5, 2009, directed to U.S. Appl. No. 11/499,360; 7 pages.

Lynch et al., U.S. Office Action mailed Jan. 27, 2010, directed to U.S. Appl. No. 11/499,360; 8 pages.

Letter re: Bang & Olufsen a/s by David Safran, Nixon Peabody, LLP, May 21, 2004, with BeoCom 6000 Sales Training Brochure, 7 pages.

Kobayashi et al. (1994) "Development of the Touch Switches with the Click Response," Koukuu Denshi Gihou No. 17, pp. 44-48 (published by the Japan Aviation Electronics Industry, Ltd.).

Photographs of Innovation 2000 Best of Show Award Presented at the 2000 Int'l CES Innovations Design & Engineering Showcase, Jan. 6, 2000, 1 page.

SanDisk Sansa Connect User Guide, 2007; 29 pages.

Translation of Trekstor's Defense Statement to the District Court Mannheim of May 23, 2008; 37 pages.

"Diamond Multimedia Announces Rio PMP300 Portable MP3 Music Player," located at http://news.harmony-central.com/Newp/1998/Rio-PMP300.html visited on May 5, 2008. (4 pages).

"About Quicktip®" www.logicad3d.com/docs/qt.html, downloaded Apr. 8, 2002.

"Alps Electric Ships GlidePoint Keyboard for the Macintosh; Includes a GlidePoint Touchpad, Erase-Eaze Backspace Key and Contoured Wrist Rest," Business Wire (Jul. 1, 1996).

"Alps Electric introduces the GlidePoint Wave Keyboard; combines a gently curved design with Alps' advanced GlidePoint Technology," Business Wire (Oct. 21, 1996).

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"Apple Unveils Optical Mouse and New Pro Keyboard," Press Release, Jul. 19, 2000.

"APS show guide to exhibitors," Physics Today 49(3) (Mar. 1996).

"Atari VCS/2600 Peripherals," www.classicgaming.com/gamingmuseum/2006p.html, downloaded Feb. 28, 2007, pp. 1-15.

"Der Klangmeister," Connect Magazine, Aug. 1998.

"Design News literature plus," Design News 51(24) (Dec. 18, 1995).

"Neuros MP3 Digital Audio Computer," www.neurosaudio.com, downloaded Apr. 9, 2003.

"OEM Touchpad Modules" website www.glidepoint.com/sales/modules.index.shtml, downloaded Feb. 13, 2002.

"Product Overview—ErgoCommander®," www.logicad3d.com/products/ErgoCommander.htm, downloaded Apr. 8, 2002.

"Product Overview—SpaceMouse® Classic," www.logicad3d.com/products/Classic.htm, downloaded Apr. 8, 2002.

"System Service and Troubleshooting Manual," www.dsplib.com/intv/Master, downloaded Dec. 11, 2002.

"Synaptics Tough Pad Interfacing Guide," Second Edition, Mar. 25, 1998, Synaptics, Inc., San Jose, CA, pp. 1-90.

"Triax Custom Controllers due; Video Game Controllers," HFD—The Weekly Home Furnishing Newspaper 67(1) (Jan. 4, 1993).

Ahl, David, "Controller Update," Creative Computing Vo. 9, No. 12, Dec. 1983.

Ahmad, "A Usable Real-Time 3D Hand Tracker," Proceedings of the 28th Asilomar Conference on Signals, Systems and Computers—Part 2 (of 2) vol. 2 (Oct. 1994).

Baig, E.C., "Your PC Just Might Need a Mouse," U.S. News & World Report 108(22) (Jun. 4, 1990).

Bang & Olufsen Telecom a/s, "BeoCom 6000 User Guide 2000."

Bartimo, Jim, "The Portables: Travelling Quickly," Computerworld (Nov. 14, 1983).

BeoCom 6000, Sales Training Brochure, date unknown.

Bray, "Phosphors help switch on xenon," Physics in Action, pp. 1-3, Apr. 1999.

Brink et al., "Pumped-up portables," U.S. News & World Report 116(21) (May 30, 1994).

Brown et al., "Windows on Tablets as a Means of Achieving Virtual Input Devices," Human-Computer Interaction—INTERACT '90 (1990).

Buxton et al., "Issues and Techniques in Touch-Sensitive Tablet Input," Computer Graphics 19(3), Proceedings of SIGGRAPH '85 (1985).

Chapweske, Adam "PS/2 Mouse/Keyboard Protocol," 1999, http://panda.cs.ndsu.nodak.edu/~achapwes/PICmicro/PS2/ps2.htm.

Chen et al., "A Study in Interactive 3-D Rotation Using 2-D Control Devices," Computer Graphics 22(4) (Aug. 1988).

Chinese Office Action issue Dec. 29, 2006, directed to CN Application No. 200510103886.3, 25 pages.

De Meyer, Kevin, "Crystal Optical Mouse," Feb. 14, 2002, Heatseekerz, Web Article 19.

Evans et al., "Tablet-based Valuators that Provide One, Two, or Three Degrees of Freedom," Computer Grahics 15(3) (Aug. 1981).

EVB Elektronik "TSOP6238 IR Receiver Modules for Infrared Remote Control Systems" dated Jan. 2004 1 page.

Fiore, "Zen Touchpad," Cornell University, May 2000.

Gadgetboy, "Point and click with the latest mice," CNET Asia Product Review, www.asia.cnet.com/reviews...are/gadgetboy/0,39001770,380235900,00.htm, downloaded Dec. 5, 2001.

Gfroerer, "Photoluminescence in Analysis of Surfaces and Interfaces," Encyclopedia of Analytical Chemistry, pp. 1-23, Copyright John Wiley & Sons Ltd, Chichester, 2000.

Jesitus, John, "Broken promises?", Industry Week/IW 246(20) (Nov. 3, 1997).

Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).

Kobayashi et al. (1997) "Dynamic Soundscape: Mapping Time to Space for Audio Browsing," Computer Human Interaction: 16 pages.

Kobayashi et al. "Development of the Touch Switches with the Click Response," Koukuu Denshi Gihou No. 17, pp. 44-48 (Mar. 1994) (published by the Japan Aviation Electronics Industry, Ltd.).

Letter re: Bang & Olufsen a/s by David Safran, Nixon Peabody, LLP May 21, 2004.

Luna Technologies International, Inc., LUNA Photoluminescent Safety Products, "Photoluminescence—What is Photoluminescence?" from website at http://www.lunaplast.com/photoluminescence.com on Dec. 27, 2005.

"Manufactures," Laser Focus World, Buyers Guide '96, 31(12) (Dec. 1995).

Mims, Forrest M., III, "A Few Quick Pointers; Mouses, Touch Screens, Touch Pads, Light Pads, and the Like Can Make System Easier to Use," Computers & Electronics (22) (May 1984).

Nass, Richard, "Touchpad input device goes digital to give portable systems a desktop 'mouse-like' feel," Electronic Design 44(18) (Sep. 3, 1996).

"National Design Engineering Show," Design News 52(5) (Mar. 4, 1996).

Perenson, Melissa, "New & Improved: Touchpad Redux," PC Magazine (Sep. 10, 1996).

Petersen, Marty, "Koala Pad Touch Tablet & Micro Illustrator Software," InfoWorld (Oct. 10, 1983).

Petruzzellis, "Force-Sensing Resistors," Electronics Now 64(3) (Mar. 1993).

Photographs of Innovation 2000 Best of Show Award Presented at the 2000 Int'l CES Innovations 2000 Design & Engineering Showcase, 1 page.

"Preview of exhibitor booths at the Philadelphia show," Air Conditioning, Heating & News 200(2) (Jan. 13, 1997).

"Product news," Design News 53(9) (May 5, 1997).

"Product news," Design News 53(11) (Jun. 9, 1997).

Sony presents "Choice Without Compromise" at IBC '97 M2 Presswire (Jul. 24, 1997).

Spiwak, Marc, "A Great New Wireless Keyboard," Popular Electronics 14(12) (Dec. 1997).

Spiwak, Marc, "A Pair of Unusual Controllers," Popular Electronics 14(4) (Apr. 1997).

Soderholm, Lars G., "Sensing Systems for 'Touch and Feel,'" Design News (May 8, 1989): pp. 72-76.

Sylvania, "Intellvision™ Intelligent Television Master Component Service Manual," pp. 1, 2 and 8, 1979.

Tessler, Franklin, "Point Pad," Macworld 12(10) (Oct. 1995).

Tessler, Franklin, "Touchpads," Macworld 13(2) (Feb. 1996).

Tessler, Franklin, "Smart Input: How to Chose from the New Generation of Innovative Input Devices," Macworld 13(5) (May 1996).

SanDisk Sansa Connect User Guide; 29 pages.

International Search Report and Written Opinion, dated Dec. 6, 2007, directed to related International Application No. PCT/US2007/015501.

"Touchpad," Notebook PC Manual, ACER Information Co. Ltd., Feb. 16, 2005, pp. 11-12.

International Search Report mailed Jul. 1, 2008, directed to PCT/US2007/084549.

Tsuk et al., U.S. Office Action mailed Apr. 28, 2010, directed to U.S. Appl. No. 11/610,190; 29 pages.

Zadesky et al., U.S. Office Action mailed Mar. 30, 2010, directed to U.S. Appl. No. 11/592,679; 13 pages.

Hotelling et al., U.S. Office Action mailed Mar. 30, 2010, directed to U.S. Appl. No. 11/483,008; 20 pages.

Elias et al., U.S. Office Action mailed Mar. 30, 2010, directed to U.S. Appl. No. 11/203,692; 15 pages.

International Report on Patentability and Written Opinion issued May 19, 2009, directed to corresponding Application No. PCT/US2007/054549.

Robbin et al., U.S. Appl. No. 60/387,692 entitled "Method and Apparatus for Use of Rotational User Inputs," filed Jun. 10, 2002.

Robbin et al., U.S. Appl. No. 60/399,806 entitled "Graphical User Interface and Methods of Use Thereof in a Multimedia Player," filed Jul. 30, 2002.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Jul. 7, 2009, directed to U.S. Appl. No. 11/610,190; 24 pages.
Robbin et al., U.S. Office Action mailed Jan. 18, 2007, directed to U.S. Appl. No. 10/259,159; 18 pages.
Robbin et al., U.S. Office Action mailed Oct. 13, 2006, directed to U.S. Appl. No. 10/259,159; 18 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.
Hotelling et al., U.S. Office Action mailed Jan. 27, 2009, directed to U.S. Appl. No. 11/882,421; 15 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Mar. 5, 2009, directed to U.S. Appl. No. 11/477,469; 12 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al.., U.S. Office Action mailed Oct. 4, 2007, directed to U.S. Appl. No. 11/806,957; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
Tsuk et al., U.S. Office Action mailed Aug. 7, 2009, directed to U.S. Appl. No. 11/610,181; 20 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Hotelling, U.S. Office Action mailed Sep. 1, 2009, directed to U.S. Appl. No. 11/482,286; 14 pages.
Lampell, U.S. Office Action mailed Sep. 15, 2009, directed to U.S. Appl. No. 11/530,807; 15 pages.
Boling, Douglas (1993) "Programming Microsoft Windows CE.NET," p. 109 (do not file in 20009).
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
Ng et al., U.S. Office Action mailed Jul. 8, 2010, directed to U.S. Appl. No. 11/882,423; 19 pages.
Tsuk et al., U.S. Office Action mailed Aug. 6, 2010, directed to U.S. Appl. No. 11/610,190; 30 pages.
Zadesky et al., U.S. Office Action mailed Aug. 2, 2010, directed to U.S. Appl. No. 11/882,004; 9 pages.
Marriott et al., U.S. Office Action mailed Aug. 19, 2010, directed to U.S. Appl. No. 11/882,422; 13 pages.
Hotelling, U.S. Office Action mailed Aug. 18, 2010, directed to U.S. Appl. No. 11/882,424; 16 pages.
Bull, U.S. Office Action mailed Jul. 9, 2010, directed to U.S. Appl. No. 11/849,801; 13 pages.
CN OA dated Nov. 5, 2010, directed to counterpart application No. 200780042046.8; 14 pages.
Ng et al., U.S. Office Action mailed Dec. 9, 2010, directed to U.S. Appl. No. 11/394,493; 13 pages.
Zadesky et al., U.S. Office Action mailed Nov. 16, 2010, directed to U.S. Appl. No. 11/477,469; 13 pages.
Lampell, U.S. Office Action mailed Dec. 3, 2010, directed to U.S. Appl. No. 11/530,807; 17 pages.
Lampell et al., U.S. Office Action mailed Dec. 22, 2010, directed to U.S. Appl. No. 11/882,427; 16 pages.
Hotelling, U.S. Office Action mailed Dec. 8, 2010, directed to U.S. Appl. No. 11/482,286; 33 pages.
Elias et al., U.S. Office Action mailed Nov. 22, 2010, directed to U.S. Appl. No. 11/203,692; 6 pages.

Zadesky et al, U.S. Office Action mailed Feb. 1, 2011, directed to U.S. Appl. No. 11/882,004; 16 pages.
Bull, U.S. Office Action mailed Feb. 4, 2011, directed to U.S. Appl. No. 11/849,801; 22 pages.
Weber et al, U.S. Office Action mailed Jan. 7, 2011, directed to U.S. Appl. No. 11/856,530; 13 pages.
Weber et al., U.S. Office Action mailed Jan. 7, 2011, directed to U.S. Appl. No. 12/205,795; 21 pages.
Weber et al., U.S. Office Action mailed Feb. 17, 2011, directed to U.S. Appl. No. 12/844,502; 11 pages.
Tsuk et al., U.S. Office Action mailed Nov. 1, 2010, directed to U.S. Appl. No. 11/959,918; 8 pages.
Tsuk et al., U.S. Office Action mailed Oct. 26, 2010, directed to U.S. Appl. No. 11/959,942; 27 pages.
Robbin et al., U.S. Office Action mailed Oct. 29, 2010, directed to U.S. Appl. No. 11/838,845; 8 pages.
Ng et al., U.S. Office Action mailed Oct. 26, 2010, directed to U.S. Appl. No. 11/882,423; 18 pages.
Zadesky et al., U.S. Office Action mailed Oct. 4, 2010, directed to U.S. Appl. No. 11/057,050; 31 pages.
McKillop et al., U.S. Office Action mailed Sep. 16, 2010, directed to U.S. Appl. No. 11/591,752; 14 pages.
Zadesky et al., U.S. Office Action mailed Sep. 29, 2010, directed to U.S. Appl. No. 11/882,003; 13 pages.
Hotelling, U.S. Office Action mailed Oct. 1, 2010, directed to U.S. Appl. No. 11/482,286; 28 pages.
Hotelling et al., U.S. Office Action mailed Oct. 27, 2010, directed to U.S. Appl. No. 11/483,008; 23 pages.
Weber et al., U.S. Office Action mailed Oct. 13, 2010, directed to U.S. Appl. No. 12/205,795; 15 pages.
EP Communication Pursuant to Article 94(3) EPC mailed Jun. 15, 2011, directed to EP Patent Application No. 07 871 453.2; 4 pages.
Chinese Second Office Action dated Jul. 22, 2011, directed to counterpart Chinese Patent Application No. 200780042046.8; 20 pages.
European Communication Pursuant to Article 94(3)EPC mailed Nov. 16, 2011, directed to counterpart European Application No. 07 871 453.2; 7 pages.
Tsuk et al., U.S. Office Action mailed Apr. 19, 2011, directed to U.S. Appl. No. 11/610,190; 25 pages.
Tsuk et al., U.S. Office Action mailed Mar. 31, 2011, directed to U.S. Appl. No. 11/959,918; 9 pages.
Robbin et al., U.S. Office Action mailed Apr. 26, 2011, directed to U.S. Appl. No. 11/838,845; 9 pages.
Zadesky et al., U.S. Office Action mailed Mar. 31, 2011, directed to U.S. Appl. No. 11/882,005; 7 pages.
McKillop et al., U.S. Office Action mailed Mar. 24, 2011, directed to U.S. Appl. No. 11/591,752; 11 pages.
Zadesky et al., U.S. Office Action mailed Mar. 16, 2011, directed to U.S. Appl. No. 11/882,003; 12 pages.
Rathnam et al., U.S. Office Action mailed Mar. 24, 2011, directed to U.S. Appl. No. 12/205,757; 14 pages.
Rejection Decision dated Apr. 24, 2012, directed to Chinese Application No. 200780042046.8; 24 pages.
Communication Pursuant to Article 94(3) EPC dated May 8, 2012, directed to European Application No. 07 871 453.2; 6 pages.
Summons to attend oral proceedings dated Dec. 7, 2012, directed to European Application No. 07871453.2-2224, 7 pages.
Office Action issued Dec. 22, 2012, directed to counterpart TW application No. 096142884; 25 pages.

* cited by examiner

METHOD OF CAPACITIVELY SENSING FINGER POSITION

CROSS REFERENCE TO RELATED APPLICATION

This application claims the benefit of U.S. Provisional Application No. 60/858,404, filed Nov. 13, 2006.

TECHNICAL FIELD

This also relates generally to sensor array configurations. In particular, this relates to sensor array configurations that allow for the accurate determination of an object's position.

BACKGROUND

Touch pads are often used in portable consumer electronic devices, such as laptop computers. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases a dedicated portion of the touch pad may be tapped.

Touch pads generally include one or more sensors for detecting the proximity of the finger thereto. By way of example, the sensors may be based on resistive sensing, surface acoustic wave sensing, pressure sensing (e.g., strain gauge), optical sensing, capacitive sensing and the like. The sensors are generally dispersed about the touch pad with each sensor representing an x, y position. In most cases, the sensors are arranged in a grid of columns and rows. Distinct x and y position signals, which control the x, y movement of a pointer device on the display screen, are thus generated when a finger is moved across the grid of sensors within the touch pad. For brevity sake, the remaining discussion will be held to the discussion of capacitive sensing technologies. It should be noted, however, that the other technologies have similar features.

Referring to FIG. 1, a touch pad 10 will be described in greater detail. The touch pad is generally a small rectangular area that includes a protective shield 12 and a plurality of electrodes 14 disposed underneath the protective shield layer 12. For ease of discussion, a portion of the protective shield layer 12 has been removed to show the electrodes 14. Each of the electrodes 14 represents a different x, y position. In one configuration, as a finger 16 approaches the electrode grid 14, a tiny change in capacitance in the location of finger 16 is detected by the electrodes 14. The circuit board/sensing electronics measures capacitance and produces an x, y input signal 18 corresponding to the active electrodes 14 that is sent to a host device 20 having a display screen 22. The x, y input signal 18 is used to control the movement of a cursor 24 on a display screen 22. As shown, the input pointer moves in a similar x, y direction as the detected x, y finger motion.

The smaller and more numerous the sensors are in a given area, the more accurately the position of an object, such as a finger, can be determined.

However, as the sensors become smaller, the signal produced by positioning an object over a sensor also becomes smaller relative to the amount of noise generated by the sensor and the sensor system. This makes the sensors less accurate and places an effective limit on the number of sensors that can be used in the sensor array covering an area.

Accordingly, a need exists for improved sensor array configurations that allow for accurate determination of finger position in a given area.

SUMMARY

Described herein are exemplary embodiments of sensor arrays that may provide for more accurate determination of an object's position. The sensor configurations may use multiple sensor elements, with each of the sensor elements having at least one dimension (a length or a width, for example) that differs from the dimensions of at least some of the other sensor elements. The multiple sensor elements may be arranged in a staggered fashion, so that the leading edges and/or the trailing edges of the sensor elements are not aligned. Such sensor configurations may enable an increase in the accuracy with which an object's position may be determined and further enable a decrease in the number of sensors required for a given area. Moreover, since fewer sensors may be required, the size of each sensor in an array may be increased, thereby improving the signal to noise ratio of the sensors in the array.

Embodiments of the sensor array configuration may include multiple sensors with varying dimensions located at different positions. For example, in a plane that may be described using an X-Y coordinate system, one and two dimensional information about the position of an object can be obtained by varying the length of the sensors and the location of the sensors in the X direction (also referred to herein as the lengthwise direction). Sensors of varying length can be arranged such that the leading edge and the trailing edge of adjacent sensors are not aligned and are instead staggered in a lengthwise direction. In this manner, not all of the sensors may intersect a given line that extends perpendicular to the X direction.

Positional information about the location of an object in the X direction of the sensors can be determined by determining which specific sensors are activated by the object. Since different sensors begin and end at different positions in the X direction, not all adjacent sensors may extend to a given X position. Accordingly, once the activated sensors are identified, the location of the object in the X direction can be determined by determining which X position transverses all of the activated sensors.

The width of the sensors may be sufficiently narrow such that an object can cover and, therefore, activate a plurality of sensors at the same time. The location of an object in the width direction can then be determined by determining which widthwise position transverses the combination of activated sensors.

Accordingly, if the sensor array is expanded to cover a two-dimensional area, the position of a finger can be determined on a Cartesian (X-Y) coordinate system by measuring the position along the length of the sensors and by measuring the position along the narrow width of the sensors.

Additionally, some of the sensors can be removed in various patterns and still maintain the ability to locate the object in space due to the fact that if an object lays across a removed sensor, the amount of object over the removed sensor can be approximated by subtracting the amount of object over the non-removed sensor or sensors. In this way, the position of the finger can be measured in two dimensions with an array that has far fewer sensors than a regular grid array and may be used in situations where utilizing a typical grid might produce sensors too small to work effectively.

In addition, any of these solutions can be adapted to sense angle along a circular path and radius from the center of the circle by reforming the sensor array in a polar coordinate system.

Embodiments of a circular sensor array may include a plurality of sensors of varying lengths positioned lengthwise around an axis. The ends of adjacent sensors may be positioned at different distances from the axis.

DETAILED DESCRIPTION OF PREFERRED EMBODIMENTS

The representative embodiments described herein relate to sensor array configurations that allow for the accurate determination of an object's position. The sensor configurations may utilize a plurality of varying length sensors that have staggered beginning and ending positions. By staggering the beginning and ending positions of the varying length sensors, fewer sensors may need to be utilized in a given area to provide accurate positional information. Further, since fewer sensors may be utilized, the size of each sensor in the area can be increased to improve the signal to noise ratio of the sensors in the array.

In the following description of preferred embodiments, reference is made to the accompanying drawings which form a part hereof. It is to be understood that other embodiments may be used and structural changes may be made without departing from the scope of the preferred embodiments. In addition, the following description includes examples that include capacitive sensors. It is understood that reference to a capacitive sensor can also refer to other types of sensors including (without limitation) resistive sensing, surface acoustic wave sensing, pressure sensing (e.g., strain gauge), optical sensing, capacitive sensing and the like. Further, although a touch pad is described as a device that can utilize the described sensor configurations, it is understood that other sensing devices, for example, touch screens can also utilize these sensor configurations.

Figure 2:
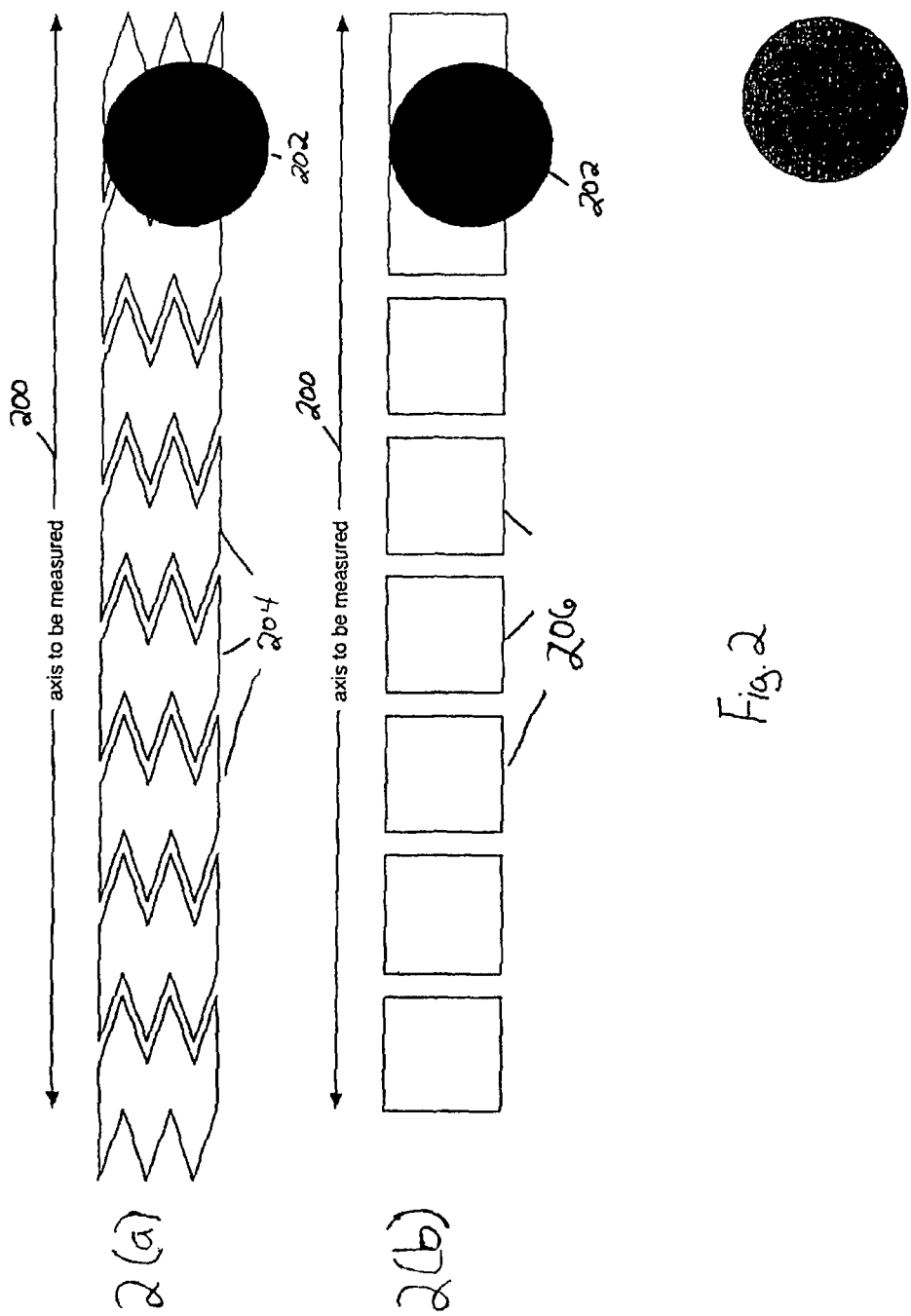
FIGS. 2(a) and 2(b) illustrate alternative examples of a capacitive sensing line according to some embodiments of the present invention.

FIG. 2(a) illustrates an example of a capacitive sensing line. In FIG. 2(a), circle 202 illustrates a finger as an object whose position is being determined. To improve the accuracy of positioning with capacitive sensors 204, finger 202 may cover more than one sensor 204 at a time. If the finger is covering only one sensor at a time, then only the presence of finger 202 on the sensor may be detected. Accordingly, one may not be able to determine the location of finger 202 any more precisely than to say it is in some position entirely within the area defined by the sensor.

If the finger covers more than one sensor, one can determine the proportion covering each sensor. For example, if fifty percent of the finger is covering each sensor then one knows the finger is located on the line between the sensors. If twenty five percent of the finger is covering one sensor and seventy five percent is covering the adjacent sensor, then one may know that more of the finger is located over the sensor getting the higher reading. That is the reason for providing sensors 204 with a zigzag shape, as shown in FIG. 2(a). The zigzag shape may enable finger 202 to be over two sensors 204 more of the time without making the sensors smaller.

FIG. 2(b) illustrates an example in which bar sensor 208 is divided into individual sensor segments 206 that are each about half the size of a finger. Decreasing the size of the sensors allows a finger to be over multiple sensor segments simultaneously. However, decreasing the size also decreases the signal to noise ratio of the sensors in the array. Accordingly, the size of the sensors may be balanced to manage these issues.

In the example shown in FIG. 2(b), two sensors 206 are covered by one finger 202. One may measure the percentage of the two sensors being covered to determine where the finger is located between the two sensors. This is another example of a method of dividing a large bar sensor into multiple sensor segments, reading all of the sensor segments and determining which segments are activated to locate the position of the finger.

In FIGS. 2(a) and 2(b), the axis to be measured 200 is broken up into eight segments 204 and 206 along that axis in order to sense movement along that axis. One may detect that two sensor segments 204 or 206 have finger 202 over them and one may measure the proportion to determine where finger 202 is located along axis to be measured 200. This method of determining finger position may be referred to as a proportional measurement technique.

Figure 3:
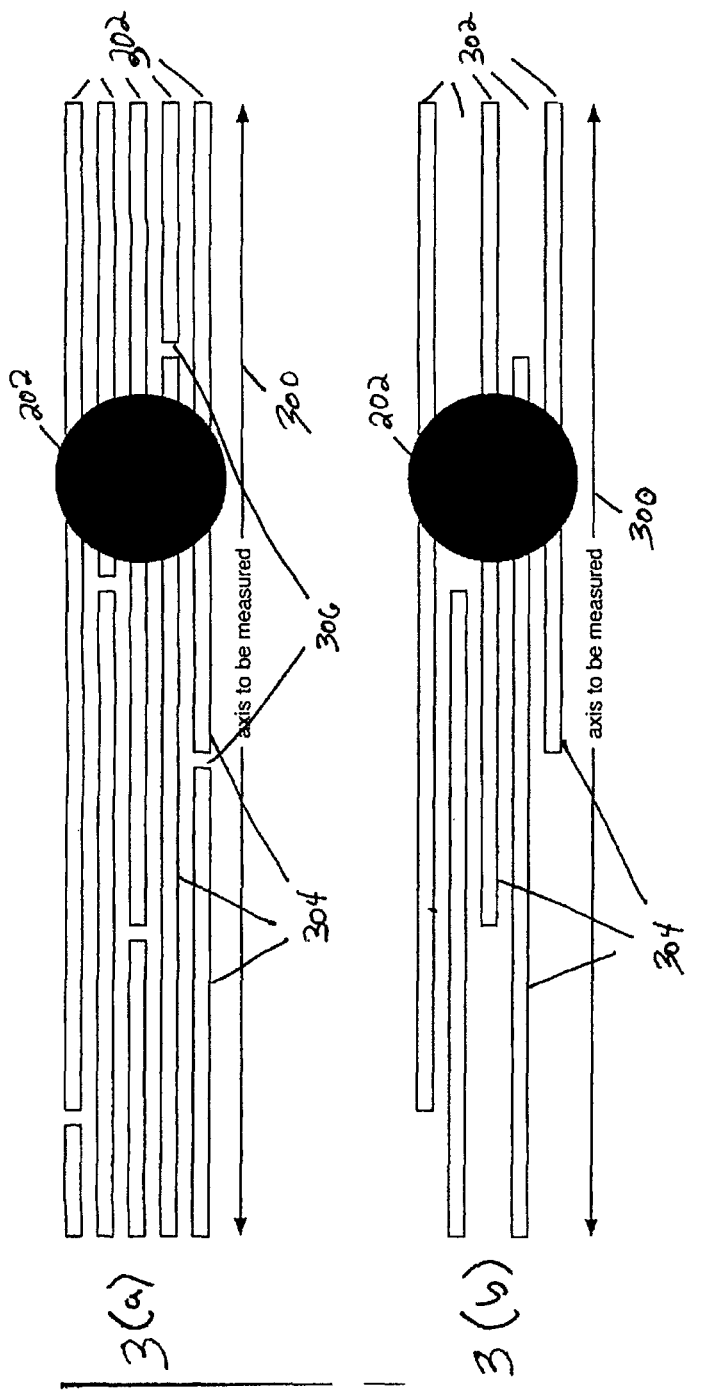
FIGS. 3(a) and 3(b) illustrate alternative examples of sensor arrangements configured to determine the position of an object along an axis to be according to some embodiments of the present invention.

FIGS. 3(a) and 3(b) illustrate alternative examples of measuring the position of an object along an axis to be measured 300 that runs the length of a series of sensor strips 302. FIG. 3(a) illustrates an example with five horizontal sensor strip rows 302 each divided into two sensor segments 304. Each sensor strip row 302 includes a break 306, with the break location being different for each row 302. FIG. 3(b) is similar to FIG. 3(a) except some of the segments 304 have been removed.

In contrast to FIGS. 2(a) and 2(b), FIG. 3(a) does not have a single sensor bar broken up along the axis to be measured. Instead, FIG. 3(a) has five sensor strip rows 302, each of which is divided at different location 306 along axis to be measured 300. Sensor strip rows 302 are sufficiently narrow and sufficiently close that one finger 202 can cover all of them at the same time. Sensor strip rows 302 are also sufficiently narrow that if finger 202 is touching one sensor segment 304 of a row it is also going to be touching another sensor segment 304 of an adjacent row.

Accordingly, the width of the sensors may be chosen to be less than the diameter of an object whose position is to be determined, for example, the diameter of a typical finger. Further, the length of one or more sensors may be chosen to be greater than the diameter of an object whose position is to be determined.

In FIG. 3(a) the topmost row of sensor strip rows 302 includes two sensor segments 302, a shorter sensor segment on the left and a longer sensor segment on the right. Finger 202 covers the longer sensor segment. The second row of sensor strip rows 302 includes a shorter sensor segment on the right and a longer sensor segment on the left. Finger 202 covers the shorter sensor segment. The third row of sensor strip rows 302 includes a shorter sensor segment on the left and a longer sensor segment on the right. Finger 202 covers the longer sensor segment. The fourth row of sensor strip rows 302 includes a shorter sensor segment on the right and a longer sensor segment on the left. Finger 202 covers the longer sensor segment. Etc.

In FIG. 3(a), since the lay-out of the sensor array is known, the location of finger 202 may be determined by determining which sensor segments 304, as described above, that the finger is over. Specifically, there is only one location on axis to be measured 300 in which finger 202 can cover the series of segments 304 previously described. One could additionally use the proportional measurement technique to more accurately determine the location of finger 202, depending on the number and location of breaks 306 in the sensor strips.

In the example shown in FIG. 3(b) every other sensor segment 304 has been removed, at both the left and the right, in an alternating fashion. This means the distance between a sensor segment 304 and an adjacent sensor segment 304 will vary along the length of the sensor segment 304.

As stated above, one finger 202 may cover all five horizontal strip rows 202 at once, due to the size, narrowness and location of the rows. Consequently, the location of finger 202 can be determined by looking at the remaining sensor segments 304 in each of the sensor rows 302 in FIG. 2(b).

Figure 1:
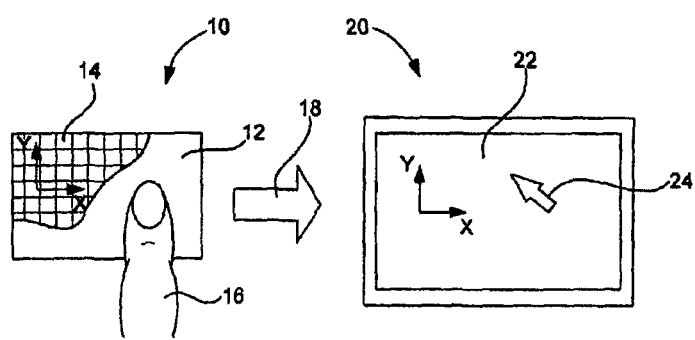
FIG. 1 illustrates an example of a touch pad and display.

Further, if finger 202 is not over a particular sensor segment 304, you can determine that finger 202 may be present in a region where a sensor segment is absent. For example, in FIG. 3(b) finger 202 is detected as being over sensor segments 304 in first and third sensor rows 302 but absent from sensor segment 304 in the second sensor row 202. Consequently, it can be determined that finger 202 is also over the right-hand space in the second row 302 of sensor segments. A similar analysis may be performed for each of the horizontal rows 302. In FIG. 3(b) there are only five sensors segments 304 in the illustrated area, in contrast to the eight sensor segments 304 shown in FIGS. 1(a) and 1(b) for an identical area. The example shown in FIG. 3(b) therefore may enable the number of sensor segments 304 to be reduced.

Figure 4:
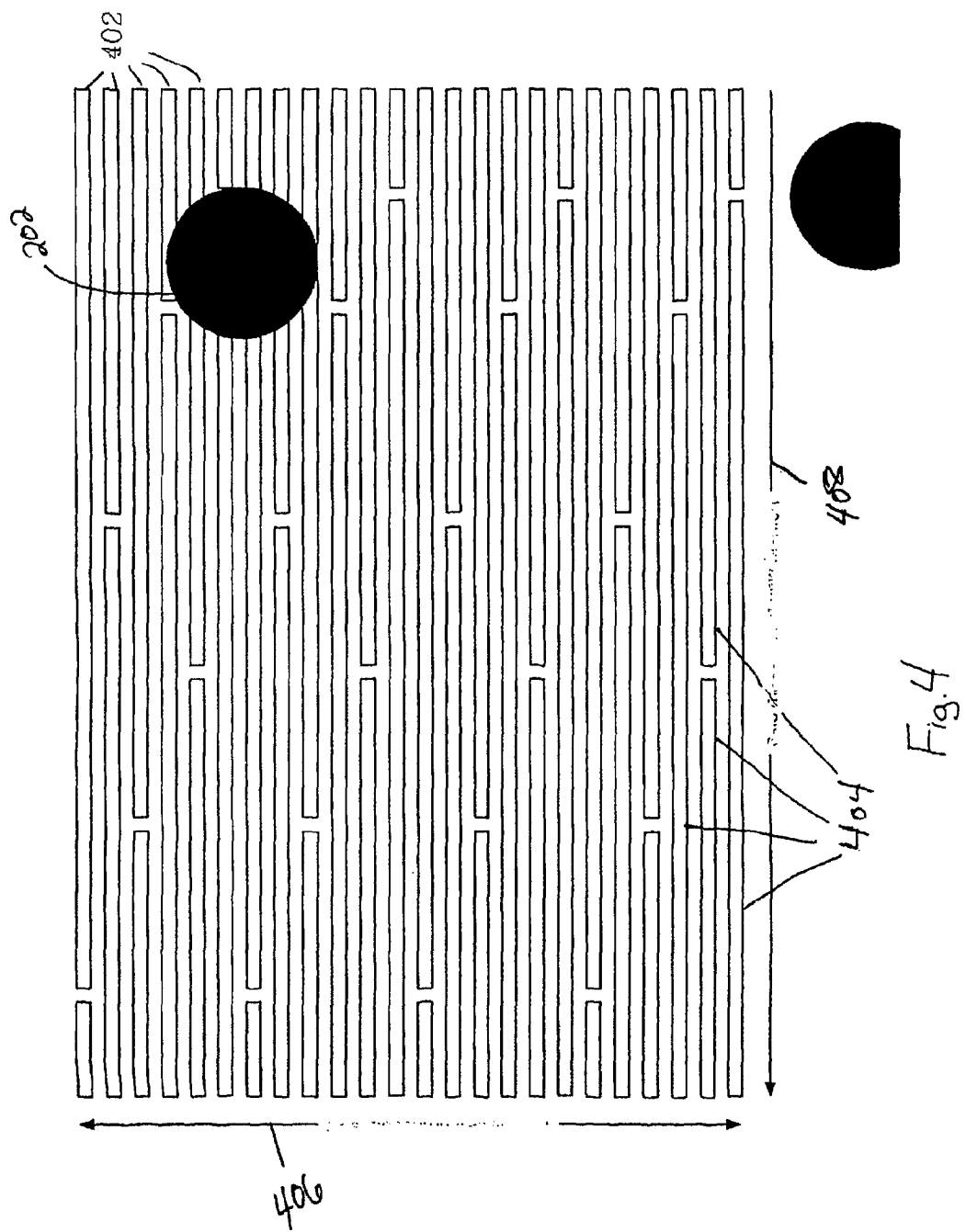
FIG. 4 illustrates an example of a sensor arrangements configured to determine the position of an object along two axes to be measured according to some embodiments of the present invention.

FIG. 4 illustrates an example in which the structure shown in FIG. 3(a) has been extended vertically. In FIG. 4 the vertical position of finger 202 along vertical axis to be measured 406 can be measured according to the method described with respect to FIG. 2(a). More specifically, each sensor row 402 can act as a sensor along a capacitive sensor line that runs along vertical axis to be measured 406. Since sensor rows 402 are thin, there are a large number of sensor rows 402 per length of the vertical axis to be measured 406. This provides for high resolution positional sensing along the vertical axis to be measured 406 according to the method described with respect to FIG. 2(a).

Because of the pattern of breaks in sensor segments 404 along horizontal axis to be measured 408, the measurement technique described with respect to FIG. 3(a) that was used to measure along axis to be measured 300 can be utilized to measure along horizontal axis to be measured 408. Accordingly, this same set of sensor segments 404 can be used to determine the location of finger 202 along both vertical axis to be measured 406 and horizontal axis to be measured 408.

Other methods of measuring along two axes utilize either a large grid of small square sensors which are, for example, half the size of the finger, or utilize two layers of sensors, for example, a vertical set on the front of a substrate and a horizontal set on the back of a substrate. Each of these methods utilizes the measurement technique described with respect to FIG. 2(a) to measure along both the vertical and horizontal axes.

Figure 5:
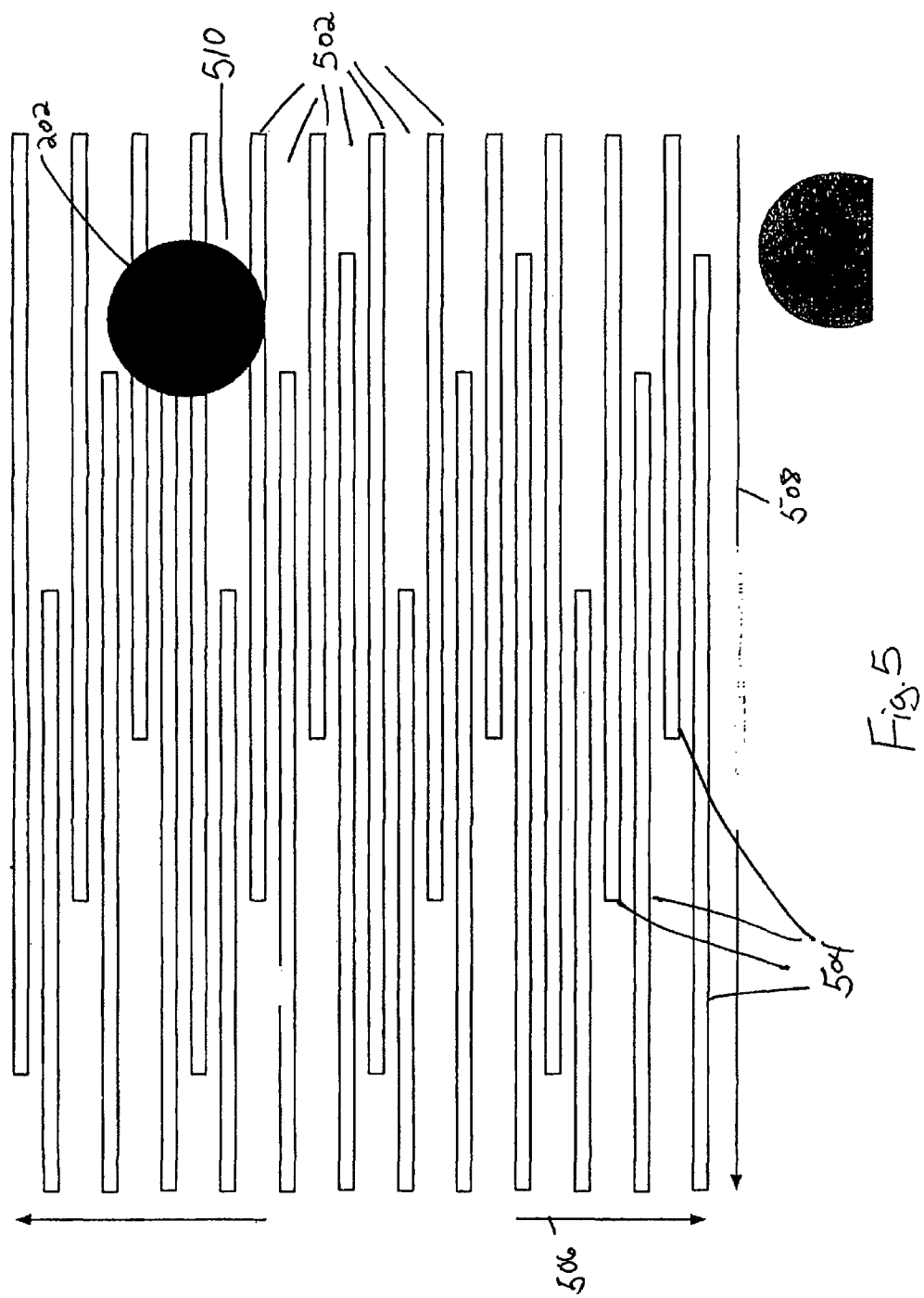
FIG. 5 illustrates another example of a sensor arrangements configured to determine the position of an object along two axes to be measured according to some embodiments of the present invention.

FIG. 5 illustrates an example in which the structure shown in FIG. 3(b) has been extended vertically. In the example shown in FIG. 5 one may be able to determine the horizontal and vertical position of finger 202 with half as many sensors as shown in FIG. 4.

Specifically, as with FIG. 4, each sensor row 502 can act as a sensor along a capacitive sensor line that runs along vertical axis to be measured 506. Since sensor rows 502 are thin, there are a large number of sensor rows 502 per length of the vertical axis to be measured 506. This may provide for high resolution sensing of position along the vertical axis to be measured 506 according to the method described with respect to FIG. 2(a). If finger 202 is over a gap position 510 in a sensor row, this can be determined by determining whether a sensor segment above and below gap 510 is activated by finger 202. If finger 202 is located both above and below gap 510, it is also over gap 510.

Further, because the pattern of breaks in sensor segments 504 along horizontal axis to be measured 508, the measurement technique described with respect to FIG. 3(b) to measure along axis to be measured 300 can be utilized to measure along horizontal axis to be measured 508. Accordingly, this same set of sensor segments 504 can be used to determine the location of finger 202 along both vertical axis to be measured 506 and horizontal axis to be measured 508.

The concept of utilizing unaligned sensor breaks to reduce the number of sensors employed to sense a position is not limited to horizontal bars or strips. The same concept may be used in a polar coordinate pattern or other pattern of two or three dimensions. For example, this concept can be mapped to sense on the interior or exterior of at least one of a torus, a cylinder, a cone, a frustrum (truncated cone), a sphere, a hemisphere, a portion of a sphere, or a variety of other geometric shapes.

In a polar configuration, multiple rings of sensors can be utilized to determine the position of a finger using polar coordinates. For example, a sensor layout might include concentric rings of sensors. Once could then determine which ring the finger is covering, the angle around that ring, and could use the proportional measurement technique to determine positions between the two rings.

However, if the sensors are arranged in concentric rings, as one moves toward the center of the circle, the size of the wedge-shaped sensor segments decreases. As each sensor segment gets smaller and the sensor area is reduced, there is a reduction in the amount of signal that can be produced by each sensor (i.e., a reduction in the reading of capacitance based on positioning the finger over the sensor). As the amount of signal becomes smaller, the signal to noise ratio also becomes lower. The sensor area of sensor segments in an inner ring in this arrangement can thus have such a low signal to noise ratio that they cannot accurately measure finger position.

Figure 6:
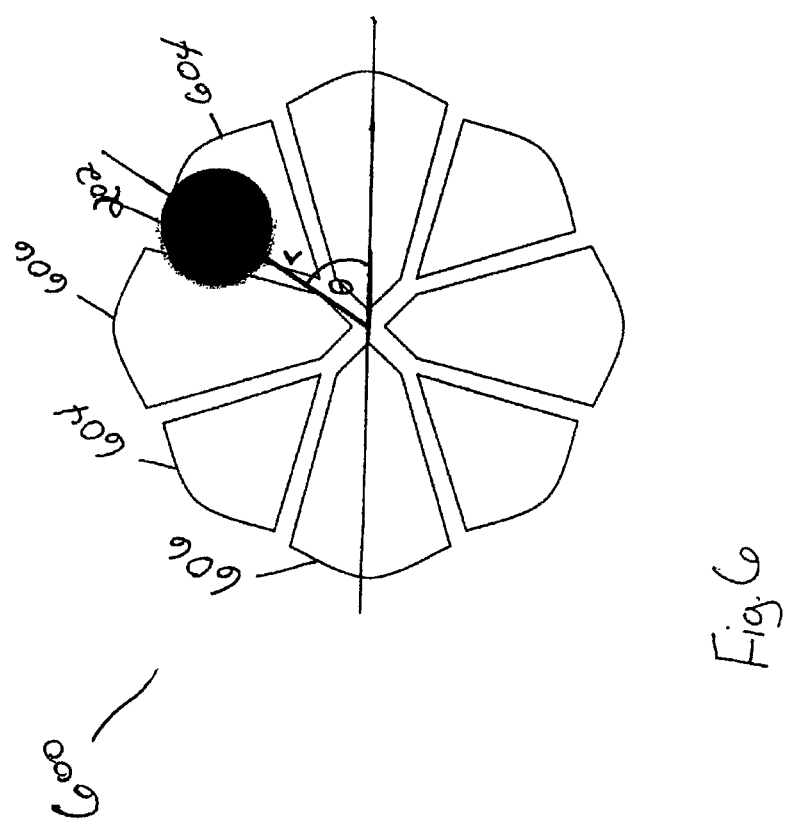
FIG. 6 illustrates an example of a sensor arrangement in a circular pattern that can be used to determine the polar position of an object according to some embodiments of the present invention.

FIG. 6 illustrates an example of an alternative sensor configuration in a circular pattern that can be utilized to accurately determine polar position utilizing fewer segments. The example shown in FIG. 6 may be viewed as a polar representation of the example shown in FIG. 5. In FIG. 6, the vertical axis to be measured of FIG. 5 is mapped to angle θ around a circle. In FIG. 6, the horizontal axis to be measured of FIG. 5 is mapped to a radius r from the center of a circle or a magnitude (if considered as a vector starting at the center of the circle). For ease of illustration, the number of sensors segments 604 and 606 depicted in FIG. 6 has been reduced relative to the number of sensor segments 504 depicted in FIG. 5.

In FIG. 6 some sensors segments 606 extend to the center of sensor array 600 and some of sensor segments 604 do not extend to the center of sensor array 600. The combination of sensor elements 604 and 606 can be used to accurately determine polar position of an object (in this case finger 202) positioned on sensor array 600. As long as the width of sensor segments is less than the width of finger 202, finger 202 will cover more than one sensor 604 and 606 at a time.

The angle θ of finger 202 can be determined using this configuration. Since segments 604 and 606 are positioned in a circle at different angles θ, the angle θ of finger 202 can be determined by determining the angle θ of the sensors 604 and 606 activated by finger 202.

The radial position of finger 202 can also be determined using this configuration. Since only segments 606 extend to the center of sensor array 600, if only sensor segments 606 are activated, then finger 202 is positioned at a radius less than the radius in which segments 604 are positioned. If a sensor segment 604 is activated in addition to a sensor segment 606, then finger 202 is positioned at a radius at which sensor segments 604 are positioned.

The layout shown in FIG. 6 reduces sensor count and allows for accurate polar positioning of an object. Further, this configuration allows for the use of smaller polar sensor array configurations.

In an alternative embodiment of the example shown in FIG. 6, one can produce a configuration with the center removed. For example, one could make the wedge shapes shorter so that they don't reach all the way to the center. This allows for the positioning of another input device, such as a button, in the center of the sensor array.

Figure 7:
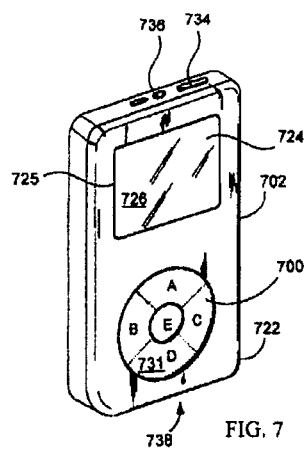
FIG. 7 illustrates an example of a perspective diagram of a media player according to some embodiments of the present invention.
Figure 8:
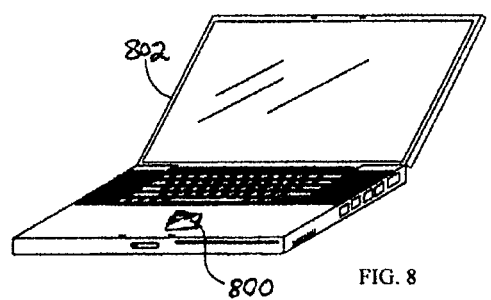
FIG. 8 illustrates an example of a perspective diagram of a laptop computer according to some embodiments of the present invention.
Figure 9:
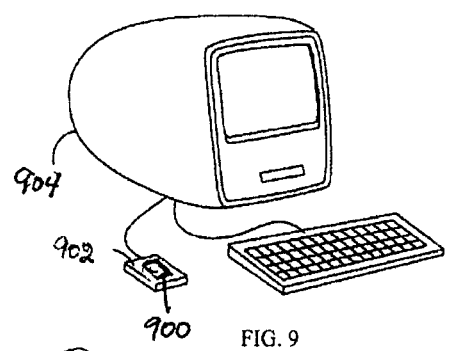
FIG. 9 illustrates an example of a perspective diagram of a desktop computer with a peripheral input device connected thereto according to some embodiments of the present invention.
Figure 10:
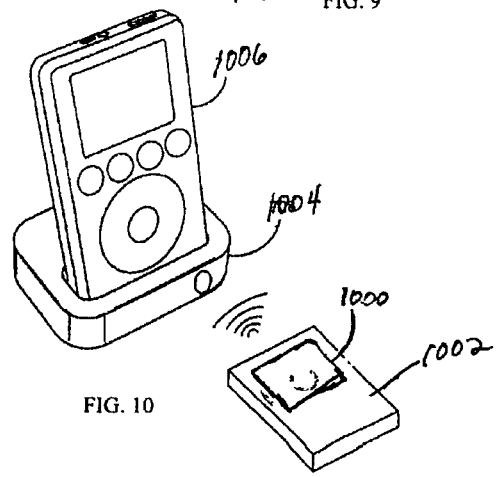
FIG. 10 illustrates an example of a perspective diagram of a remote control using an input device according to some embodiments of the present invention.

As previously mentioned, the sensor arrays described herein may be integrated into an electronic device as an input device or they may be used in other sensing type devices. FIGS. 7 and 8 show some implementations of a touch pad sensor array integrated into an electronic device. In FIG. 7, touch pad 700 is incorporated into media player 702. In FIG. 8, touch pad 800 is incorporated into laptop computer 802. FIGS. 9 and 10, on the other hand, show some implementations of a touch pad sensor array used in peripheral devices. In FIG. 9, touch pad 900 is included in peripheral device 902 that is connected to a desktop computer 904. In FIG. 10, touch pad 1000 is incorporated in remote control 1002 that wirelessly connects to docking station 1004 with media player 1006 docked therein. It should be noted, however, that the remote control can also be configured to interact with the media player (or other electronic device) directly and thereby eliminating the need for a docking station. An example of a docking station for a media player can be found in U.S. patent application Ser. No. 10/423,490, entitled "MEDIA PLAYER SYSTEM," filed Apr. 25, 2003, which is hereby incorporated by reference. It should be noted that these particular embodiments are not a limitation and that many other devices and configurations may be used.

Referring back to FIG. 7, media player 702 will be discussed in greater detail. The term "media player" generally refers to computing devices that may be dedicated to processing media such as audio, video or other images, as for example, music players, game players, video players, video recorders, cameras, and the like. In some cases, the media players contain single functionality (e.g., a media player dedicated to playing music) and in other cases the media players contain multiple functionality (e.g., a media player that plays music, displays video, stores pictures and the like). In either case, these devices are generally portable so as to allow a user to listen to music, play games or video, record video or take pictures wherever the user travels.

In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a laptop or notebook computer). For example, in the case of a music player, a user may use the device while working out at the gym. In case of a camera, a user may use the device while mountain climbing. In the case of a game player, the user may use the device while traveling in a car. Furthermore, the device may be operated by the user's hands. No reference surface, such as a desktop, is needed. In the illustrated embodiment, media player 702 is a pocket sized handheld MP3 music player that allows a user to store a large collection of music (e.g., in some cases up to 4,000 CD-quality songs). By way of example, the MP3 music player may correspond to the iPod® brand MP3 player manufactured by Apple Computer, Inc. of Cupertino, Calif. Although used primarily for storing and playing music, the MP3 music player shown herein may also include additional functionality such as storing a calendar and phone lists, storing and playing games, storing photos and the like. In fact, in some cases, it may act as a highly transportable storage device.

As shown in FIG. 7, media player 702 includes housing 722 that encloses various electrical components (including integrated circuit chips and other circuitry) internally to provide computing operations for the media player 702. In addition, housing 722 may also define the shape or form of the media player 702. That is, the contour of housing 722 may embody the outward physical appearance of media player 702. The integrated circuit chips and other circuitry contained within housing 722 may include a microprocessor (e.g., CPU), memory (e.g., ROM, RAM), a power supply (e.g., battery), a circuit board, a hard drive, other memory (e.g., flash) and/or various input/output (I/O) support circuitry. The electrical components may also include components for inputting or outputting music or sound such as a microphone, amplifier and a digital signal processor (DSP). The electrical components may also include components for capturing images such as image sensors (e.g., charge coupled device (CCD) or complimentary metal-oxide semiconductor (CMOS)) or optics (e.g., lenses, splitters, filters).

In the illustrated embodiment, media player 702 includes a hard drive thereby giving the media player massive storage capacity. For example, a 20 GB hard drive can store up to 4000 songs or about 266 hours of music. In contrast, flash-based media players on average store up to 128 MB, or about two hours, of music. The hard drive capacity may be widely varied (e.g., 5, 10, 20 GB, etc.). In addition to the hard drive, media player 702 shown herein also includes a battery such as a rechargeable lithium polymer battery. These types of batteries are capable of offering about 10 hours of continuous playtime to the media player.

Media player 702 also includes display screen 724 and related circuitry. Display screen 724 is used to display a graphical user interface as well as other information to the user (e.g., text, objects, graphics). By way of example, the display screen 724 may be a liquid crystal display (LCD). In one particular embodiment, the display screen corresponds to a 160-by-128-pixel high-resolution display, with a white LED backlight to give clear visibility in daylight as well as low-light conditions. As shown, display screen 724 is visible to a user of media player 702 through opening 725 in housing 722 and through transparent wall 726 that is disposed in front of opening 725. Although transparent, transparent wall 726 may be considered part of housing 722 since it helps to define the shape or form of media player 702.

Media player 702 also includes touch pad 700 including a sensor array such as any of those previously described. Touch pad 700 generally consists of touchable outer surface 731 for receiving a finger for manipulation on touch pad 730. Although not shown in FIG. 7, beneath the touchable outer surface 731 is the sensor array arrangement. The sensor arrangement includes a plurality of sensors that may be configured to activate as the finger sits on, taps on or passes over them. In the simplest case, an electrical signal is produced each time the finger is positioned over a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by media player 702 to perform the desired control function on display screen 724. For example, a user may easily scroll through a list of songs by swirling the finger around touch pad 700.

In addition to above, the touch pad may also include one or more movable buttons zones A-D as well as a center button E. The button zones are configured to provide one or more dedicated control functions for making selections or issuing commands associated with operating media player 702. By way of example, in the case of an MP3 music player, the button functions may be associated with opening a menu, playing a song, fast forwarding a song, seeking through a menu, making selections and the like. In most cases, the button functions are implemented via a mechanical clicking action.

The position of touch pad 700 relative to housing 722 may be widely varied. For example, touch pad 700 may be placed at any external surface (e.g., top, side, front, or back) of housing 722 that is accessible to a user during manipulation of media player 702. In most cases, touch sensitive surface 731 of touch pad 700 is completely exposed to the user. In the embodiment illustrated in FIG. 7, touch pad 700 is located in a lower front area of housing 722. Furthermore, touch pad 700 may be recessed below, level with, or extend above the surface of housing 722. In the embodiment illustrated in FIG. 7, touch sensitive surface 731 of touch pad 700 is substantially flush with the external surface of the housing 722.

The shape of touch pad 700 may also be widely varied. Although shown as circular, the touch pad may also be square, rectangular, triangular, and the like. More particularly, the touch pad is annular, i.e., shaped like or forming a ring. As such, the inner and outer perimeter of the touch pad defines the working boundary of the touch pad.

Media player 702 may also include hold switch 734. Hold switch 734 is configured to activate or deactivate the touch pad and/or buttons associated therewith. This is generally done to prevent unwanted commands by the touch pad and/or buttons, as for example, when the media player is stored inside a user's pocket. When deactivated, signals from the buttons and/or touch pad are not sent or are disregarded by the media player. When activated, signals from the buttons and/or touch pad are sent and therefore received and processed by the media player.

Moreover, media player 702 may also include one or more headphone jacks 736 and one or more data ports 738. Headphone jack 736 is capable of receiving a headphone connector associated with headphones configured for listening to sound being outputted by media device 702. Data port 738, on the other hand, is capable of receiving a data connector/cable assembly configured for transmitting and receiving data to and from a host device such as a general purpose computer (e.g., desktop computer, portable computer). By way of example, data port 738 may be used to upload or download audio, video and other images to and from media device 702. For example, the data port may be used to download songs and play lists, audio books, ebooks, photos, and the like into the storage mechanism of the media player.

Data port 738 may be widely varied. For example, the data port may be a PS/2 port, a serial port, a parallel port, a USB port, a Firewire port and/or the like. In some cases, data port 738 may be a radio frequency (RF) link or optical infrared (IR) link to eliminate the need for a cable. Although not shown in FIG. 7, media player 702 may also include a power port that receives a power connector/cable assembly configured for delivering power to media player 702. In some cases, data port 738 may serve as both a data and power port. In the illustrated embodiment, data port 738 is a Firewire port having both data and power capabilities.

Although only one data port is shown, it should be noted that this is not a limitation and that multiple data ports may be incorporated into the media player. In a similar vein, the data port may include multiple data functionality, i.e., integrating the functionality of multiple data ports into a single data port. Furthermore, it should be noted that the position of the hold switch, headphone jack and data port on the housing may be widely varied. That is, they are not limited to the positions shown in FIG. 7. They may be positioned almost anywhere on the housing (e.g., front, back, sides, top, bottom). For example, the data port may be positioned on the top surface of the housing rather than the bottom surface as shown.

Although the various exemplary embodiments have been fully described with reference to the accompanying drawings, it is to be noted that various changes and modifications will become apparent to those skilled in the art. Such changes and modifications are to be understood as being included within the scope of the subject matter defined by the appended claims.

What is claimed is:

1. A sensor array comprising:
   a plurality of sensors of varying length,
   wherein the sensors have a length direction and a width direction smaller than the length direction, centroids of adjacent sensors are staggered in the length direction of the sensors, and a first distance in the width direction between a sensor and a first adjacent sensor on a side of the sensor is less than a second distance in the width direction between the sensor and a second adjacent sensor on the same side of the sensor.

2. The sensor array of claim 1, wherein the device is configured to provide a position of an object in contact with the device.

3. The sensor array of claim 2, wherein a width of the sensors is configured to be less than a dimension of the object in contact with the device.

4. The sensor array of claim 2, wherein the length of the sensors is configured to be greater than a dimension of the object in contact with the device.

5. The sensor array of claim 2, wherein the varying distance between a sensor and an adjacent sensor is configured to be less than a dimension of an object in contact with the device.

6. The sensor array of claim 2, wherein the object is a finger.

7. The sensor array of claim 2, wherein the device is configured to provide the polar coordinate position of the object.

8. The sensor array of claim 2, wherein the device is configured to provide the Cartesian coordinate position of the object.

9. The sensor array of claim 1, wherein the sensors are positioned parallel to one another.

10. The sensor array of claim 1, wherein the sensors are positioned lengthwise around an axis.

11. The sensor array of claim 1, wherein the sensors are based on resistive sensing, surface acoustic wave sensing, pressure sensing, optical sensing, or capacitive sensing.

12. The sensor array of claim 1, wherein the sensors are based on capacitive sensing.

13. The sensor array of claim 1, wherein the device comprises at least one of a media player, a desktop computer, a laptop computer, a PDA, a cellular phone, or a remote control.

14. A sensor array comprising:
a plurality of sensors of varying length each having a length direction and a width direction smaller than the length direction, the sensors being positioned lengthwise around an axis such that the sensors extend toward the axis in the length direction,
wherein ends of adjacent sensors in the length direction are positioned at different distances from the axis and none of the sensors reaches the axis.

15. The sensor array of claim 14, wherein the device is configured to provide a position of an object in contact with the device.

16. The sensor array of claim 14, wherein a width of the sensors is configured to be less than a dimension of an object in contact with the device.

17. The sensor array of claim 14, wherein the length of the sensors is configured to be greater than a dimension of the object in contact with the device.

18. The sensor array of claim 14, wherein the device is configured to provide the polar coordinate position of the object.

19. A sensor array comprising
a plurality of sensors of uniform width along a length of the sensor, the length being greater than the width for each sensor, and positioned parallel to an axis to be measured,
wherein adjacent sensors begin and end at different positions along the axis to be measured, and a first distance in the width direction between a sensor and a first adjacent sensor on a side of the sensor is less than a second distance in the width direction between the sensor and a second adjacent sensor on the same side of the sensor.

20. The sensor array of claim 19, wherein the device is configured to provide a position of an object in contact with the device.

21. The sensor array of claim 20, wherein a width of the sensors is configured to be less than a dimension of an object in contact with the device.

22. The sensor array of claim 20, wherein the length of the sensors is configured to be greater than a dimension of the object in contact with the device.

23. The sensor array of claim 20, wherein the varying distance between a sensor and an adjacent sensor is configured to be less than a dimension of an object in contact with the device.

24. A sensor array comprising:
a plurality of sensors of varying length and uniform width along the length of the sensor, the length being greater than the width for each sensor,
wherein the length of each sensor is a distance between a first end and a second end of each sensor,
ends of adjacent sensors in a length direction of the sensors are staggered, and
a first distance between the first end of a sensor and a first adjacent sensor on a side of the sensor is greater than a second distance between the second end of the sensor and a second adjacent sensor on the same side of the sensor.

25. A method of determining a position of an object utilizing a sensor array comprising:
measuring an amount of the object positioned on a sensor array comprising a plurality of sensors of varying length and uniform width along the length of the sensor, the length being greater than the width for each sensor, wherein ends of adjacent sensors in a length direction of the sensors are staggered and a first distance between a sensor and a first adjacent sensor on a side of the sensor differs from a second distance between the sensor and a second adjacent sensor on the same side of the sensor; and
correlating the measured amount to a position of the object on the sensor array.

26. A method of making a sensor array comprising:
positioning a plurality of sensors of varying length and uniform width along the length of the sensor, the length being greater than the width for each sensor, on a substrate such that adjacent sensors in a length direction of the sensors are staggered and a first distance between a sensor and a first adjacent sensor on a side of the sensor differs from a second distance between the sensor and a second adjacent sensor on the same side of the sensor.

27. A portable device comprising:
a sensor array comprising a plurality of sensors of varying length and uniform width along the length of the sensor, the length being greater than the width for each sensor, wherein ends of adjacent sensors in a length direction of the sensors are staggered, a first distance between a sensor and a first adjacent sensor on a side of the sensor differs from a second distance between the sensor and a second adjacent sensor on the same side of the sensor, and the sensor array is configured to generate a signal dependent on the position of an object relative to the sensor array; and
a processor configured to execute a command that is dependent upon the signal.

28. A method comprising:
disposing an array of spaced, object detecting sensors relative to a surface, the sensors having a first dimension relative to the surface and a second dimension relative to the surface,
a first space in the second dimension between a sensor and a first adjacent sensor on a side of the sensor being less than a second space in the second dimension between the sensor and a second adjacent sensor on the same side of the sensor, identifying, along at least one of the first dimension and the second dimension, sensors in the array that detect an object and sensors in the array that do not detect an object, whereby a position of an object relative to the surface is detected.

29. The method of claim 28 wherein the first dimension is measurable along a first linear axis and the second dimension is measurable along a second linear axis.

30. The method of claim 29 wherein the first linear axis and the second linear axis mutually define an angle of 90°.

31. The method of claim 28 wherein the first dimension is measurable along a radial axis of a circle and wherein the second dimension is measurable by an angle subtended at the center of the circle.

32. A device comprising:
an array of spaced, object detecting sensors disposed relative to a surface, the sensors having a first dimension relative to the surface and a second dimension relative to the surface, a first space in the second dimension between a sensor and a first adjacent sensor on a side of the sensor being less than a second space in the second dimension between the sensor and a second adjacent sensor on the same side of the sensor, a processor configured to identify, along at least one of the first dimension and the second dimension, sensors in the array that detect an object and sensors in the array that do not detect an object, whereby a position of an object relative to the surface is detected.

33. The device of claim 32 wherein the first dimension is measurable along a first linear axis and the second dimension is measurable along a second linear axis.

34. The device of claim 33 wherein the first linear axis and the second linear axis mutually define an angle of 90°.

35. The device of claim 32 wherein the first dimension is measurable along a radial axis of a circle and wherein the second dimension is measurable by an angle subtended at the center of the circle.

36. A sensor array including a plurality of sensors each having a length along an x axis and a width along a y axis, the plurality of sensors comprising:
a first sensor having a first length and ending on one side at a first position along the x axis;
a second sensor having a second length and ending on the same side at a second position along the x axis; and
a third sensor having a third length and ending on the same side at a third position along the x axis,
wherein the second sensor is adjacent to the first sensor and the third sensor, the first, second, and third lengths are different from each other, and the first, second, and third positions each have a different coordinate along the x axis, and
wherein the plurality of sensors are situated in a sensing area such that gaps are present, the gaps being portions of the sensing area along the x axis of the sensors that are not covered by the sensors as a result of the different lengths and positions of the sensors.

37. The sensor array of claim 36 wherein the first, second, and third sensors constitute a first plurality of adjacent sensors, the sensor array comprising a second plurality of adjacent sensors identical to the first plurality of adjacent sensors except that the second plurality of adjacent sensors is situated in the sensing area adjacent to the first plurality of adjacent sensors such that the gaps associated with the second plurality of adjacent sensors are present at opposite sides of the sensing area and in a mirror image relative to the gaps associated with the first plurality of adjacent sensors.

* * * * *